United States Patent Office 3,573,321
Patented Mar. 30, 1971

3,573,321
BENZIMIDAZOLE-2-CARBAMATES SUBSTITUTED ON THE BENZENE RING
Constantino John Di Cuollo, Drexel Hill, James A. Miller, Malvern, and Joseph R. Valenta, Stafford, Pa., assignors to Smith Kline & French Laboratories, Philadelphia, Pa.
No Drawing. Filed Dec. 11, 1967, Ser. No. 689,340
Int. Cl. C07d 49/38
U.S. Cl. 260—309.2     3 Claims

ABSTRACT OF THE DISCLOSURE

Benzimizolyl carbamic acids substituted on the benzene nucleus by carboxylated alkyl and alkoxy groups are disclosed as having activity against helminthiasis in animals. They may be prepared by microbiological oxidation of benzene ring substituted 2-carboalkoxyaminobenzimidazoles, or synthetically by starting with an appropriate p-nitrophenyl alkanoic acid.

---

This invention relates to benzene ring substituted esters of benzimidazolyl carbamic acids, and to methods for producing anthelmintic activity using said esters.

According to one aspect of the invention, there are provided an anthelmintic composition and method of producing anthelmintic activity which utilizes as the essential active ingredient certain esters of benzimidazolyl carbamic acid represented by the general formula:

Formula I

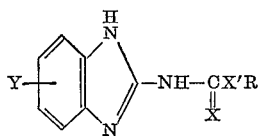

R is alkyl straight or branched containing from one to six carbon atoms; cycloalkyl including alkyl cycloalkyl containing from three to ten carbon atoms; alkenyl straight or branched chain containing from two to ten carbon atoms; alkynyl straight or branched containing from two to ten carbon atoms; phenyl; or naphthyl;

X and X' are oxygen or sulfur, with at least one of them being oxygen; and

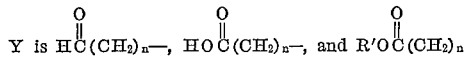

wherein R' is alkyl from one to six carbon atoms, and $n$ is an integer from one to eight.

It is preferred to use as the active ingredient of the novel compositions of this invention, compounds as shown in Formula II below:

Formula II

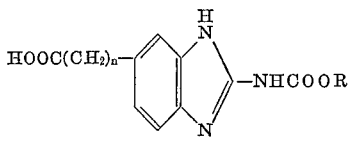

wherein R is lower alkyl containing from one to three carbon atoms, and $n$ is an integer from one to five.

For example, a novel compound within Formula II of efficacy is 2 - carbomethoxyamino-5-[γ-carboxypropyl]-benzimidazole (Compound No. 32,882) which demonstrated 60.2% activity against the mouse pinworm at 100 mg./kg.

Examples of specific compounds falling within Formula I are:

2-carbomethoxyamino-5-[γ-carboxypropyl]-benzimidazole
2-carboethoxyamino-5-[β-carboxyethyl]-benzimidazole
2-carbopropyoxyamino-5-[α-carboxymethyl]-benzimidazole
2-carbobutoxyamino-5-[α-carboxymethyl]-benzimidazole
2-carbopentoxyamino-5-[γ-carboxypropyl]-benzimidazole
2-carbohexyloxyamino-5-[Δ-carboxybutyl]-benzimidazole
2-carbocyclopropyloxyamino-5-[γ-carboxypropyl]-benzimidazole
2-carbocyclobutyloxyamino-5-[β-carboxyethyl]-benzimidazole
2-carbocyclopentyloxyamino-5-[carboxymethyl]-benzimidazole
2-carbocycloheptyloxyamino-5-[γ-carboxypropyl]-benzimidazole
2-carbocyclohexyloxyamino-5-[Δ-carboxybutyl]-benzimidazole
2-carbomethoxyamino-5-[γ-carboxypropyl]-benzimidazole, methyl ester
2-carbomethoxyamino-5-[β-carboxyethyl]-benzimidazole, ethyl ester
2-carbomethoxyamino-5-[carboxymethyl]-benzimidazole, propyl ester
2-carbophenoxyamino-5-[γ-carboxypropyl]-benzimidazole
2-carbonaphthyloxyamino-5-[β-carboxyethyl]-benzimidazole
2-carbohexyloxyamino-5-formylmethylbenzimidazole
2-carboamyloxyamino-5-[β-formylethyl]-benzimidazole
2-carbobutoxyamino-5-[γ-formylpropyl]-benzimidazole
2-carbopropoxyamino-5-[Δ-formylbutyl]-benzimidazole
2-carboethoxyamino-5-[ν-formylamyl]-benzimidazole
2-carbomethoxyamino-5-[ζ-formylhexyl]-benzimidazole
2-carbovinyloxyamino-5-[Δ-carboxybutyl]-benzimidazole
2-carboallyloxyamino-5-[γ-formylpropyl]-benzimidazole
2-carbomethallyloxyamino-[β-formylethyl]-benzimidazole
2-carbodimethallyloxyamino-5-[γ-formylmethyl]-benzimidazole
2-carbopropargyloxyamino-5-[ε-carboxyamyl]-benzimidazole
2-carbobutynoxyamino-5-[Δ-carboxybutyl]-benzimidazole
2-carbopentynoxyamino-5-[γ-formylpropyl]-benzimidazole
2-carbohexynoxyamino-5-[β-formylethyl]-benzimidazole
2-carbocyclopropyloxyamino-5-[β-formylethyl]-benzimidazole
2-carbocyclobutyloxyamino-5-[β-formylethyl]-benzimidazole The compounds of Formula I wherein R is alkyl, X and X' are oxygen, and Y is

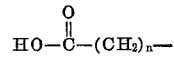

may be prepared starting with the appropriate p-nitrophenyl alkanoic acid. This intermediate is reduced and is acylated with an appropriate anhydride, to give the corresponding (p-alkanoylaminophenyl)-alkanoic acid, followed by nitration with red fuming nitric acid and hydrolysis to give the corresponding 3-nitrophenyl-4-amino alkanoic acid. This latter intermediate is reduced to yield an alkanoic acid substituted o-phenylenediamine. The diamine intermediate is converted, by the later-detailed thiourea sulfate process, to the corresponding 2-carboalkoxyamino-5-carboxyalkylbenzimidazole.

The compounds of Formula I in which R is alkyl X and X' are oxygen, and Y is

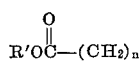

are prepared starting with the compounds having Y equal to

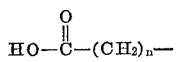

and treating in the conventional manner with the appropriate esterifying agent to yield the corresponding ester.

The compounds of Formula I in which R is alkyl, X and X' are oxygen, and Y is

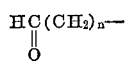

are prepared starting with a benzimidazole of I wherein Y is $HO(CH_2)_n-$, treating with pyridinium trifluoroacetate and dicyclohexylcarbodiimide, in a suitable solvent such as DMSO, according to the general procedure of Pfilzner and Moffat, J. Amer. Chem. Soc., 87, 5667 (1963).

The compounds of the invention are prepared either by microbiological or chemical methods.

When a microbiological synthesis is utilized, a 5(6)-alkyl- or 5(6)-alkoxy-2-carboalkoxyaminobenzimidazole is subjected to the enzymatic action of certain microorganisms, among the microorganisms found to be useful are *Cunninghamella bainiera* ATCC 9244.

Other Cunninghamella species may also be used. In such a microbiological process, one of these microorganisms is cultivated in, or on, a medium favorable to their development. Liquid media, such as a nutrient broth, comprising 2% dehydrated potato extract Difco and 2% glucose are preferred for submerged fermentation. The media should contain sources of available carbon, nitrogen and minerals.

Carbohydrate, such as starches, dextrins and sugars including hexoses and pentoses may be used to furnish the energy and carbon requirements of the microorganisms. Other sources of carbon may also be used, for example, citric acid and its salts, sodium acetate, alcohols or fatty acids.

Sources of nitrogen in assimilable form are made available by soluble or insoluble vegetable or animal protein and protein derivatives such as soybean meal, casein, meat extracts and peptones. Amino acids, ammonium salts, nitrates, corn steep liquor or yeast extract can also be used.

Minerals naturally present in the above carbon and nitrogen sources are sufficient to satisfy the requirements of the microorganisms.

A sterile air supply should be maintained during the fermentation. This is accomplished by exposing a large surface of the growth medium to the atmosphere with constant agitation, or alternatively by the use of submerged aeration devices. Aeration at a rate of about 0.5 to 2.0 volumes of air per volume of growth medium per minute produces satisfactory results.

During the fermentation the temperature should be maintained within a range of about 23° C. to 32° C., preferably from about 25° C. to 30° C.

Optimum growth of the microorganisms and optimum transformation of the steroid substrates are achieved when the pH of the fermentation is maintained within a range of 5.5 to 6.0. This is accomplished by the intermittent addition of mineral acids or bases to adjust the pH, or by the incorporation of buffering agents in the fermentation medium. Buffering agents such as calcium carbonate or potassium dihydrogen phosphate may be used.

The benzimidazole substrate to be transformed is added to the growing culture of the microorganism as a finely divided solid or in solution in a suitable solvent, such as water, ethanol, methanol or acetone. The addition of the steroid substrate to the microbial culture should be made under aseptic conditions. The incubation and aeration of the culture is continued in order to bring about the transformation of the steroid substrate. Alternatively, the steroid substrate may be added to the fermentation medium at the time the medium is first inoculated with the culture of microorganism.

When the compound transformation has progressed to its maximum stage, the fermentation is terminated and the steroid compounds, both untransformed substrate and the transformation products, are recovered. This is most commonly done by extraction of the aqueous fermentation broth with organic solvents which are immiscible with water. Chloroform, methylene chloride, or methyl isobutyl ketone are most satisfactorily used. The whole fermentation broth, including microbial cells and aqueous supernatant fluid, can be extracted or, alternatively, the cellular mass of the microorganism can first be separated from the aqueous supernatant fluid by centrifugation or filtration. In the latter case, extraction of steroid compounds from the microbial cellular mass is best accomplished by a mixture of solvents, one of which is water-miscible, the other water-immiscible. We have found a 1:1 mixture of methylene chloride:ethanol most satisfactory. Be extracting cells and aqueous supernatant broth separately the formation of troublesome emulsions is often avoided.

The solvent extracts are pooled and residual traces of water are removed with suitable drying agents, such as anhydrous sodium sulfate. The dried solvent extract is then concentrated in vacuo to dryness at temperatures generally not exceeding 60° C. A brownish-colored residue results which contains the steroid compounds of interest as well as solvent extractable compounds produced as a result of microbial metabolism. It is necessary to remove these contaminating materials in order to obtain the desired compounds in a purified state.

In certain cases in which the desired product is present in high concentration, purification can be achieved by direct crystallization by the use of solvents. Acetone-hexane mixtures can often be used. However, if a mixture of products results from the fermentation process, or if a significant amount of untransformed steroid substrate remains, more elaborate purification procedures are required. We have used column chromatography most satisfactorily for these purifications. The methods used are known to those skilled in the art, and consists in general of the gradient elution of the products from a column of adsorbent material (such as silica or alumina) by mixtures of organic solvents. The presence of the separated compounds in the solvent fractions obtained after column chromatography is most easily determined by paper or thin layer chromatographic analysis of aliquot samples. The appropriate fractions containing purified steroids are crystallized from appropriate solvent mixtures.

It will be readily apparent to one skilled in this art that certain of the substituted 2-aminobenzimidazole compounds (R' is branched) of this invention may have asymmetric carbon atoms, forming optically active d- and l-compounds. The connotation of the general formulas presented herein is intended to include the separated d- or l-optical isomers, as well as racemic mixtures of these isomers.

If desired, the isomers may be separated for individual use by resolution methods known to the art, such as fractional crystallization of the l-tartrate salts of the carbamates. Alternatively, a synthesis starting with an optically active side chain may yield the desired optical isomer.

The compounds of Formula I being weak bases will normally form salts with inorganic and organic acids. Accordingly, the nontoxic salts formed with pharmaceutically acceptable strong inorganic and organic acids may be alternatively employed in the compositions of the invention. Other nontoxic molecular complexes known to exist that can be derived from compounds of Formula I may also be used in this invention, since the anthelmintic activity rests in the benzimidazolyl carbamic acid structure itself.

A process for making the anthelmintic compounds of this invention starts with an S-lower alkyl pseudothiourea sulfate. This sulfate is condensed with an appropriately substituted o-phenylenediamine yields the corresponding benzimidazole-2-carbamic acid, alkyl ester.

The o-phenylenediamine reactant can have substituents on the benzene ring which correspond to Y as defined in Formula I. The resulting benzimidazoles bear these substituents at the corresponding position of the benzene ring. The nature of the condensation reaction is such that it is generally applicable to o-phenylenediamines, regardless of the substituents which may appear on the benzene ring.

Benzimidazolyl carbamates of Formula I have been found to possess useful anthelmintic properties, that is, broad spectrum activity against parasites of warm blooded animals, including both mature and immature parasitic forms. In particular, these compounds have been found to exhibit activity against various helmintic infections of the intestinal tract of economically important animals, coupled with low systemic toxicity to the host animal.

For example, the disclosed compounds are generally effective in clearing mice of worm infections for laboratory purposes, among others: *Syphacia obvelata* and *Aspicularis tetraptera* (mouse pinworm).

Other susceptible helminths include *Toxocara canis*, found in naturally infested dogs. Also, parasitic to this host are *Ancylostoma canium*, *Trichuris vulpis* (whip worm), and *Physalaptera spp.*

Compounds of Formula I are efficacious against parasitic gastroenteritis in sheep, such as *Haemonchus contortus*, *Ostertagia spp.*, *Trichostrongylus spp.*, *Nematodirus spp.*, *Trichuris ovis*, *Cooperia spp.*, and *Strongyloides papillosus*, *Bunostomum trigonocephalum* and *Oesophagostomum spp.*, are other important parasites of sheep.

Animals of low weight are treated with unit doses ranging no higher than a few milligrams; whereas animals of high body weight, such as ruminants, require proportionately larger unit doses ranging up to several grams. Preferably, a single dose is administered daily for each animal species based on the weight of that species.

The amount of ingredient administered will depend on the weight of the host, but will usually be between about 1 mg./kg. and 500 mg./kg. of body weight daily.

For example, 2 - carbomethoxyamino - 5 - [γ-carboxypropyl]-benzimidazole at an oral daily dose of 100 mg./kg. tested in clearing mice of natural pinworm infection, following generally the method of McCowen et al., reported in the American Journal of Tropical Medicine, 6, 894 (1957), gave a 60.2% result in terms of worms cleared.

In practice, a pharmacologically active compound of structural Formula I is usually formulated with a nontoxic carrier therefore to give anthelmintic compositions of this invention. The carrier may be an orally ingestible container for the active ingredient, for example, a hard or soft gelatin capsule; or it may be a pharmaceutically acceptable diluent or excipient of the kind normally used in the production of medicaments, ready for use, for example maize starch, terra alba, lactose, sucrose, calcium phosphate, gelatin, talcum, stearic acid, magnesium stearate, dextrin, agar, pectin or acacia.

Exemplary of liquid carriers are peanut oil, olive oil, sesame oil, and water. Similarly, the carrier or diluent may include a time delay material such as glyceryl monostearate or glyceryl distearate along or with a wax.

A wide variety of pharmaceutical forms can be employed. Thus, if a solid carrier is used, the preparation can be tableted, placed in a hard gelatin capsule, or compounded in the form of a troche or lozenge. The amount of solid carrier will vary widely but preferably will be from about 25 mg. to about 3 gm. If a liquid carrier is used, the preparation may be in the form of a soft gelatin capsule, placed in an ampule or in liquid suspension.

The compositions are most often made up in a form suitable for internal administration and may therefore take the form of a liquid, for example, an emulsion or a sterile solution or suspension in water, oil, such as arachis oil, or other liquid.

The compositions are advantageously made up in a dosage unit form adapted for the desired mode of administration. Thus for the preferred oral administration, the dosage unit may take the form of a suspension, tablet, packaged powder, bolus, or encapsulated powder. The quantity of active ingredient in each dosage unit will be such that one or more units are required for each therapeutic administration.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharamceutical or veterinary composition as hereinbefore described. The daily dose range commonly used is from about 1 mg./kg. to about 500 mg./kg. depending on the species of host and regimen used. One dose per day administration is preferred but up to five of the dosage units described above may be used if desired.

Where tableting is used, the resulting tablets are then coated with metyl methacrylate to form an enteric coating, i.e. a coating which is substantially insoluble in gastric secretion but substantially soluble in intestinal fluids.

It will be appreciated that the active ingredient used in the formulation of the tablets described above may be replaced with other compounds of Formula I having the necessary anthelmintic activity. Furthermore, other materials may be used to form the enteric coating, for example other synthetic plastic materials such as methyl acrylate, cellulose derivatives, hydrogenated caster oil or phthalates.

The compositions thusly prepared are administered, usually orally, to an infected host from 1–5 times daily for anthelmintic activity.

The following examples illustrate syntheses which may be employed in formulating the compositions of the invention but are not considered limiting the invention described herebefore.

EXAMPLE 1

(I) Production of 5-[γ-carboxypropyl]-2-carbomethoxyaminobenzimidazole

*Cunninghamella bainieri* ATCC9244 is grown in an aqueous medium containing 2% dehydrated potato extract (Difco) and 2% glucose, adjusted to pH 6.5 before autoclaving. Growth conditions in the fermenter are 30 c., 200 r.p.m., and aeration at the rate of 1 v./v./m. Twenty-four to forty-eight hours are required for suitable growth of the fungus depending upon the percentage inoculum used for the fermenter. When the desired growth has taken place the fungal cells are collected by basket centrifugation, washed with water to remove traces of the growth medium, and suspended in sterile 1.5% glucose solution. The glucose cell suspension is returned to the fermenter, the conditions being the same as those used for growth of the fungus. 5-n-butyl-2-carbomethoxyaminobenzimidazole, in water as a fine suspension, is added to the glucose cell suspension to the concentration of 0.5 mgs. of chemical per ml. of total medium. The pH during reaction is maintained at 5.5–6. When TLC analysis indicated a suitable concentration of the desired product the transformation was terminated. The fungal cells are removed by basket centrifugation.

(II) Isolation of 5-[γ-carboxypropyl]-2-carbomethoxyaminobenzimidazole

The aqueous transformation centrifugate is concentrated at 45 c. in vacuo and adjusted with NaOH to pH 9.0. This is followed by extensive extraction of the aqueous solution with chloroform until these chloroform extracts, as adjudged by TLC, contain no 5-n-butyl-2-carbomethoxyaminobenzimidazole or other of its metabolic products extractable under these conditions. The aqueous solution is then adjusted to pH 5.0 and again extracted extensively with chlorofrom. These chloroform extracts are combined and dried over sodium sulfate, and concentrated at 30 c. in vacuo. During the final phase of concentration of these combined, dried, chloroform extracts, a white crystalline product accumulates. This product is filtered from the concentrated chloroform extracts and air dried. The chloroform filtrate is concentrated further and a second crop of the same crystalline product is obtained and collected in the same manner. The remaining chloroform filtrate is evaporated to dryness and the resulting material dissolved in hot methanol. Upon addition of an excess of acetone to the cooled methanolic solution, a third crop of the same crystalline product is obtained.

EXAMPLE 2

Preparation of 2-carbomethoxyamino-5-[γ-carboxypropyl]-benzimidazole

γ-(p-nitrophenyl)-butyric acid (15.69 g.—0.075 mole), 270 ml. of glacial acetic acid, 17.7 ml. (19.1 g.—0.187 mole) of acetic anhydride, and 1.569 g. of palladium catalyst (10% by weight on charcoal) are added to a Paar bottle, with the mixture being shaken under 60 p.s.i. hydrogen (initial) at room temperature for two hours.

The catalyst is removed by filtration on "Supercel" the filtrate being evaporated to dryness, giving 16.3 g. of a white solid, M.P. 169–173° C. This crude material is recrystallized from 690 ml. of 20% aqueous ethanol, to give 15.04 g. of white needles of γ-(p-acetamidophenyl)-butyric acid, M.P. 176–177° C.

To 15.0 g. (0.0678 mole) 4-(p-acetamidophenyl)-butyric acid and 40 ml. of acetic anhydride, cooled to −5° C., is added dropwise a mixture of 15 ml. of red fuming nitric acid and 10 ml. of glacial acetic acid, over 40 minutes with efficient stirring. This solution is stirred at 2° C. for 2 hours, poured onto ice, and extracted with ethyl acetate. The extracts are evaporated in vacuo to an oil. Ether was added and the mixture cooled to −50° C.

The thick yellow crystalline solid is filtered, washed with cold ether (about 35 ml.), and air dried overnight yielding 11.76 g. of crude material, which is recrystallized from 400 ml. of 30% aqueous ethanol, air dried overnight, giving orange-yellow needles of γ-(4-acetamido-3-nitrophenyl)-butyric acid, M.P. 144–146° C.

γ - (4 - acetamido - 3 - nitrophenyl) - butyric acid (3.0 g.—0.0112 mole) in concentrated 20 ml. of concentrated HCl is added to a 125 ml. Erlenmeyer flask. The resulting orange solution is heated on a steam bath for one hour, cooled to about 40° C. and 40 ml. of water is added, the mixture cooled to 0° C., forming an orange precipitate, which is collected by filtration and oven dried to give 2.32 g. of orange plates [γ-(4-amino-3-nitrophenyl)-butyric acid], M.P. 116–117° C.

To 175 ml. of glacial acetic acid in a Paar shaker is added 4.9 g. (0.0219 mole of γ-(4-amino-3-nitrophenyl)-butyric acid, and 0.49 g. palladium catalyst (10% by weight on charcoal). The orange reaction mixture is shaken under hydrogen at 60 p.s.i. at room temperature for three hours. The catalyst is removed by filtration over "Supercel," and the filtrate is concentrated in vacuo to a dark red oil [γ-(3,4-diaminophenyl)-butyric acid], which is immediately taken up in 100 ml. of 30% aqueous ethanol.

To a 200 ml. round bottom single neck flask, equipped with a magnetic stirrer, a reflux condenser containing a thermometer, and effluent caustic traps is added 6.2 g. (0.03 mole) of N,N'-bis(carbomethoxy)-S-methyl thiopseudourea and a solution of γ-(3,4-diaminophenyl)-butyric acid in 100 ml. of 30% aqueous ethanol. The mixture is heated to reflux during which time methylmercaptan rapidly evolves. Refluxing is continued for two hours and then the mixture is allowed to cool.

The tan solid which forms is filtered, washed with water followed by acetone, until the effluent is colorless. The crude product is air dried, the solid is dissolved in 35 Ml. 6 N HCl at room temperature. When crystal formation starts, the mixture is refrigerated for one hour. The solid hydrochloride is filtered, then dissolved in water, decolorized, refiltered over "Supercel," and the filtrate adjusted to pH 5 with 10% NaOH, causing precipitation of the desired benzimidazole.

The precipitate is filtered, washed with water followed by acetone, and air dried, yielding 3.8 g. of an off white solid (2 - carbomethoxyamino-5-[γ-carboxypropyl]-benzimidazole) M.P. 210–250° C. with decomposition.

The structure is confirmed by elemental analysis and spectral data.

EXAMPLE 3

Typical cattle bolus containing an anthelmintic described herein

|  | Grams |
| --- | --- |
| 2 - carbomethoxyamino - 5 - [γ - carboxypropyl]-benzimidazole | 2.0 |
| Calcium phosphate | 2.5 |
| Maize starch | 0.54 |
| Talcum | 0.14 |
| Gum arabic | 0.15 |
| Magnesium stearate | 0.05 |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a No. 10 mesh screen and dried at 110–130° F. for about 8 hours. The dried materials then passed through a No. 16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a No. 10 mesh screen.

EXAMPLE 4

Typical sheep drench containing an anthelmintic described herein

|  | Parts by weight |
| --- | --- |
| 2 - carbomethoxyamino - 5 - [γ - carboxypropyl]-benzimidazole | 60 |
| Terra alba, English | 35.5 |
| Tragacanth, U.S.P. | 3.0 |
| Sodium lauryl sulfate | 1.5 |
| Water. | |

We claim:
1. A compound of the formula

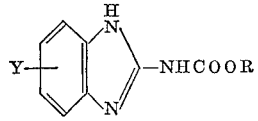 —NHCOOR wherein

R is alkyl of one to six carbon atoms; cycloalkyl of three to ten carbon atoms; alkenyl, straight or branched chain, of two to ten carbon atoms; alkynyl, straight or branched, of two to ten carbon atoms; phenyl; or naphthyl; and

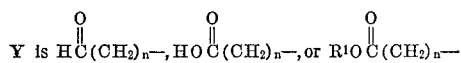

wherein $n$ is an integer from one to eight and $R^1$ is alkyl from one to six carbons.

2. A compound of claim 1, being the compound 2-carbomethoxyamino-5-(γ-carboxypropyl)benzimidazole.

3. A compound as claimed in claim 1, in which Y is

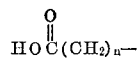

and R is methyl.

References Cited

UNITED STATES PATENTS 3,010,968  11/1961  Loux _____ 260—309.2

FOREIGN PATENTS 58,510  9/1967  Germany _____ 260—309.2

NATALIE TROUSOF, Primary Examiner

U.S. Cl. X.R.

195—29; 424—273